United States Patent [19]
Jenett

[11] Patent Number: 5,867,641
[45] Date of Patent: Feb. 2, 1999

[54] FLASH TRANSLATION LAYER CLEANUP SYSTEM AND METHOD

[75] Inventor: Detlef Jenett, Erfurt, Germany

[73] Assignee: SCM Microsystems (U.S.) Inc., Los Gatos, Calif.

[21] Appl. No.: 549,476

[22] Filed: Oct. 27, 1995

[51] Int. Cl.⁶ .................................................. G06F 12/16
[52] U.S. Cl. ..................... 395/182.05; 711/103; 711/202
[58] Field of Search ..................... 395/182.01, 182.05, 395/182.06, 405, 430, 497.04, 456, 412, 413, 416, 419; 365/185.29, 185.33, 230.03; 711/103, 202

[56] References Cited

U.S. PATENT DOCUMENTS

| | | | |
|---|---|---|---|
| 5,341,330 | 8/1994 | Wells et al | 365/185 |
| 5,341,339 | 8/1994 | Wells | 365/218 |
| 5,371,876 | 12/1994 | Ewertz et al. | 395/425 |
| 5,375,222 | 12/1994 | Robinson et al. | 395/425 |
| 5,379,401 | 1/1995 | Robinson et al. | 395/425 |
| 5,388,248 | 2/1995 | Robinson et al. | 395/425 |
| 5,402,383 | 3/1995 | Akaogi | 365/218 |
| 5,404,485 | 4/1995 | Ban | 395/425 |
| 5,422,855 | 6/1995 | Eslick et al. | 365/226 |
| 5,428,579 | 6/1995 | Robinson et al. | 365/230.03 |
| 5,535,328 | 7/1996 | Harari et al. | 395/182.05 |
| 5,559,956 | 9/1996 | Sukegawa | 395/182.06 |

FOREIGN PATENT DOCUMENTS

WO 94/20906 9/1994 WIPO .

OTHER PUBLICATIONS

"Unauffaellige Brueckenbauer" by Hermann Strass, Elektronik, vol. 43, No. 22, Oct. 31, 1994, pp. 146–150.

"Block Flash File Systems Deliver Mass Storage for Mobile Computing" by Amir Friedman, Computer Technology Review Supplement, Dec. 21, 1994, pp. 84, 86 and 88.

*Primary Examiner*—Tod R. Swann
*Assistant Examiner*—Hiep T. Nguyen
*Attorney, Agent, or Firm*—Robert P. Sabath; Edward B. Weller

[57] ABSTRACT

A system and method of cleaning up a full erase unit in a flash translation layer, including moving all valid blocks on the full erase unit to a corresponding address location on a predetermined transfer unit, and then erasing the contents of the full erase unit. After erasure, the formerly full erase unit is redesignated to become the next transfer unit to which the contents of the next full unit will be transferred. The method also includes determining whether a criterion has been met for cleanup to be undertaken. The criteria for undertaking cleanup includes determining whether the number of free blocks is greater than a threshold which is a function of twice the number of bad blocks in the transfer erase unit plus twice the number of flash translation layer structure blocks in the full erase unit.

3 Claims, 7 Drawing Sheets

FLASH TRANSLATION LAYER CLEANUP SYSTEM AND METHOD

CROSS-REFERENCE TO RELATED APPLICATION

This application is related to another patent application Ser. No. 08/549,031 filed on even date herewith Oct. 27, 1995 under the title, Flash Translation Layer Block Indication Map Revision System and Method, which is hereby expressly referenced and incorporated herein in its entirety.

TECHNICAL FIELD OF THE INVENTION

This invention relates to systems and methods for interfacing flash memory cards and personal computers.

BACKGROUND

Computers, including but not limited to personal computers (PCs) and personal digital assistants (PDAs) use operating systems having predetermined file structures. The file structures are adapted for interfacing with mechanical drives (e.g., hard drives and floppy drives). Data can be written directly over other data designated for deletion.

Flash memory cards are configured in erase blocks, which must be completely erased prior to any data being written within a particular erase block.

A flash translation layer has been developed to interface between flash memory card erase blocks and the file system used by a PC operating system. One such FTL is described in U.S. Pat. No. 5,404,485 which issued in 1995. The FTL connects flash memory cards to the file system used by the operating system of a particular PC, not allowing more than one write without erase at the same address.

The conventional practice of background clean-up operations interspersing primary read and write activities creates complications and difficulties in maintaining updated FTL tables and other structures of the FTL essential to operation.

SUMMARY OF THE INVENTION

According to the present invention, the flash memory card is scanned at its header for FTL information including identification of free, used and bad block addresses, and control data to enable translation of virtual to physical addresses.

According to the present invention, the flash memory card is erased in quantities of a single erase unit for each erase operation. Cleanup operation includes identifying the erase unit within a particular flash memory card which has the greatest number of deleted blocks. The flash memory card erase unit which has the greatest number of deleted blocks is designated as the full unit. Another erase unit on the flash memory card is designated the transfer unit.

According to the present invention, if address corresponding blocks in full and transfer units are respectively valid and bad, the particular valid unit is read from the full unit and written to a not-completely full unit. The fact of a bad block being present in a particular flash memory card is indicated by assigning the relationship FreeTHold>2 to that flash memory card. In that case, repeated checks are conducted for each address location in full and transfer units in the particular flash memory card, to determine a correspondence relationship in which the full unit address location is valid and the corresponding address location on the transfer unit is bad.

According to the present invention, the beginning of transfer operations in noted, marked, or recorded. After initiation of operations, all valid blocks on the full erase unit are moved to a corresponding address location on the transfer unit, leaving the deleted blocks on the full unit subject to erasure in block. Then, after all the valid blocks on the full unit have been moved to the transfer unit, the full unit is erased and designated the new or next in order transfer unit. The former transfer unit relinquishes its former role or designation as transfer unit, and the former fullest erase unit becomes the new transfer unit, by designation of a selected indication in the logical to physical translation information in the designated erase unit header to reflect the status of transfer unit, according to one embodiment of the present invention. Relevant FTL structures and tables are next updates with respect to the logical to physical unit map and the free block count, inter alia. At the conclusion of operations, the end of transfers is noted, marked, or recorded.

DETAILED DESCRIPTION OF THE INVENTION

Figure 1A:
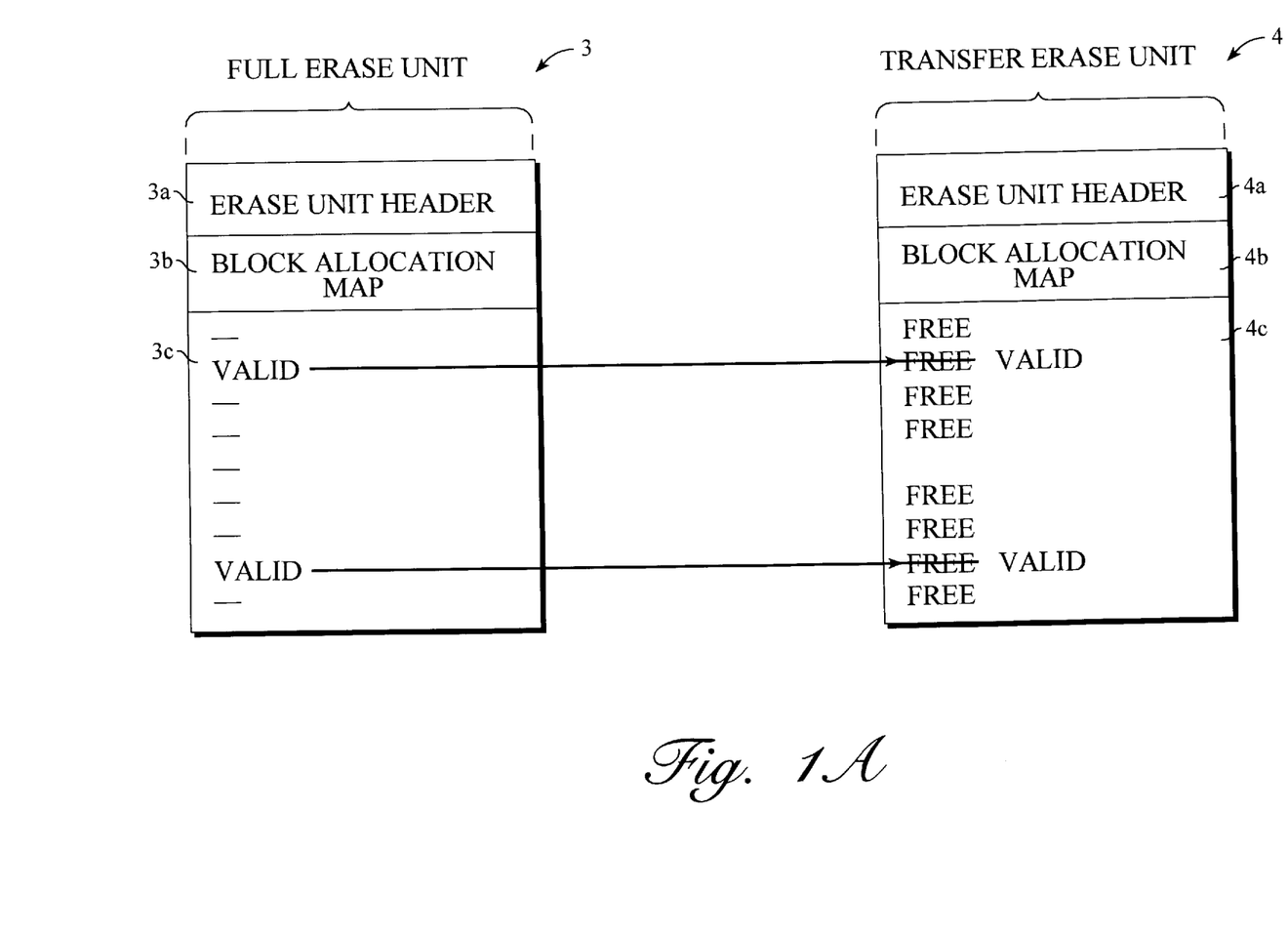
FIG. 1a is a diagram of the full and transfer erase units of a flash memory card array and medium, which cooperate according to the present invention to ensure removal of all valid data units in the full unit to corresponding memory locations in a selected transfer unit, prior to erasure of the full unit.

FIG. 1a is a diagram of first and second erase units, respectively designated full and transfer erase units, 3 and 4. As is well-known, flash memory card arrays and media are organized in erase units. Such erase units 3 and 4 are described in detail below in connection with the text accompanying FIG. 1c. As part of a clean-up operation according to the present invention, first and second, i.e., full and transfer erase units, respectively 3 and 4 cooperate to ensure the removal of all valid data units from full erase unit 3 to corresponding memory locations in transfer erase unit 4, prior to erasure of full erase unit 3. Clean-up is performed when predetermined conditions are met, as will be discussed in detail below, particularly with respect to FIG. 3. Simply stated, if there are no bad blocks, clean-up begins when there are only two free blocks available, beyond any free blocks required to account for FTL structure blocks. If there are bad blocks, depending on the number of bad blocks, cleanup is undertaken much earlier, before the number of free blocks diminishes below a threshold which is a function of no less than twice the number of bad blocks and twice the number of FTL structure blocks, plus a constant, which is preferably two.

As shown in FIG. 1a, full erase unit 3 includes an erase unit header 3a; a block allocation map 3b (BAM); a plurality of BAM indications of the status of particular blocks in full erase unit 3 as valid, invalid, or free; and a plurality of memory locations for data storage in sectors as will be described in detail below in the text accompanying FIG. 1c.

Transfer unit 4 shown in FIG. 1a shows transfer erase unit 4 including an erase unit header 4a, a block allocation map 4b (BAM), a plurality of BAM indications of the status of particular blocks in transfer erase unit 4 as valid, invalid, or free; and a plurality of memory locations for data storage in sectors as will be described in detail below in the text accompanying FIG. 1c. The second and the second to last memory locations of block allocation map 3b include valid blocks. The second and the second to last memory locations of block allocation map 4b similarly are shown to include valid blocks, because according to the present invention, the valid blocks of full erase unit 3 are moved to corresponding free memory locations in transfer unit 4. Thus, the second and the second to last memory units of transfer erase unit 4 which were formerly "FREE" are now redesignated as "VALID," by the movement of the associated data in full erase unit 3 to corresponding memory locations in transfer erase unit 4.

Figure 1B:
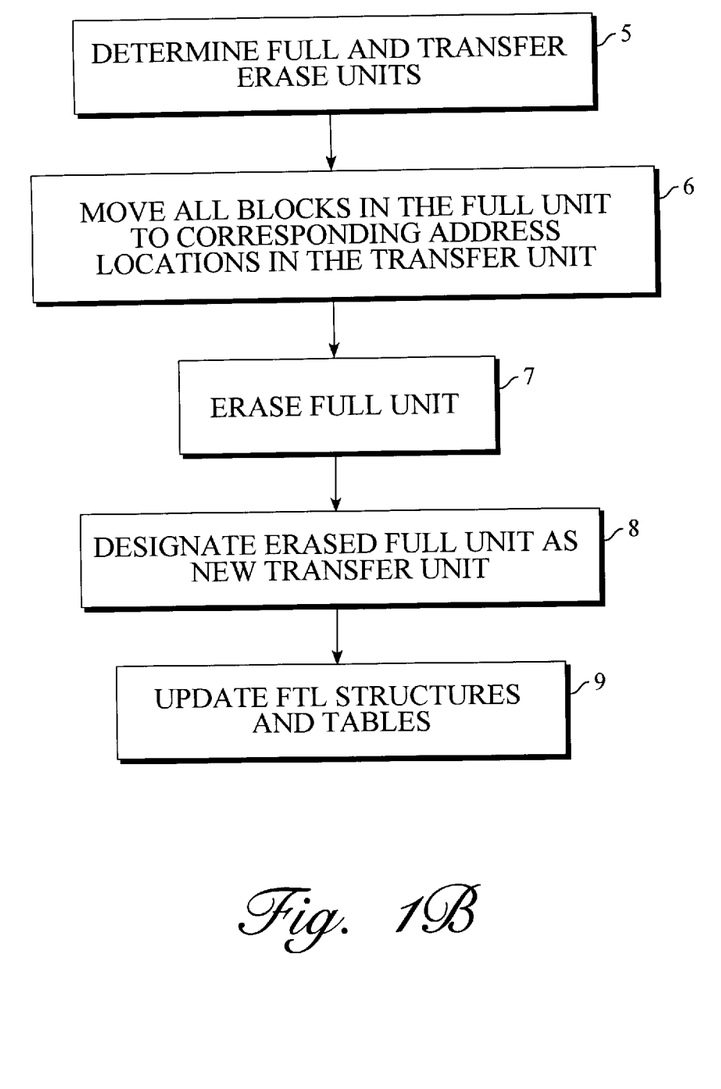
FIG. 1b is a flow chart of the block erase method according to the present invention.

FIG. 1b is a flow chart of the block erase method according to the present invention. In particular, according to the method of the present invention, at least a single full erase unit 3 and at least a single transfer unit are identified or determined. Further, valid blocks of data in the full unit 3 are transferred 6 to corresponding address locations in the transfer unit 4. Once all valid blocks of data in the full unit 3 have been moved to corresponding locations in the transfer unit 4, the full unit 3 is erased 7. Next, the erased full unit 3 is redesignated 8 as a new transfer unit 4. Additionally, the FTL structures and tables are updated 9 to reflect new address locations for information which has been relocated from the full unit 3 to the transfer unit 4.

According to the present invention, at least a single full erase unit 3 and at least a single transfer unit are identified or determined 5. In particular, according to one embodiment of the present invention, a particular one of the erase units on a particular flash memory card array and medium is predesignated to serve as the transfer erase unit 4. According to an embodiment of the present invention, the particular designated erase unit is selected, by virtue of its having no data currently stored in its memory region. Thus, the selected transfer erase unit 4. can serve as a completely available memory unit to accept "transfer" of data or information from a transferor erase unit, which may be undergoing maintenance, revision, reconstruction, or clearance.

According to the present invention, transfer erase unit 4 shown in FIG. 1a is a region of flash memory which is designated for receipt of data during clean-up operation from one or more other erase units on a particular selected flash medium. Further according to one embodiment of the present invention, data is provided to transfer erase unit 4 from one source erase unit which may be partially or completely full of data. According to one embodiment, the source erase unit 3 for data being transferred to the transfer unit can be an erase unit which is absolutely full with data. Such an erase unit cannot receive additional data for storage from an additional data source such as another erase unit. According to another embodiment, the source erase unit for data being transferred may be an erase unit which is relatively full of data. This fullness of data is relative in comparison to one or more other erase units which contain some data. Such erase units can receive only limited additional data from another source for storage before they are completely full. Additionally, the source erase unit may be an erase unit which is selected from a pool of erase units each of which contains some data. Selection of the source erase unit can be accomplished according to a predetermined selection criterion, which can be chosen arbitrarily or established in a more formal fashion. According to one embodiment, the selection criterion for determining the source erase unit requires selection of an erase unit which is the fullest erase unit in terms of data contained within the erase unit. An erase unit is full, according to one embodiment of the present invention, when it does not have any free memory locations. Fullness of an erase unit is determined by measuring the number of free memory locations in which data can be stored.

Figure 1C:
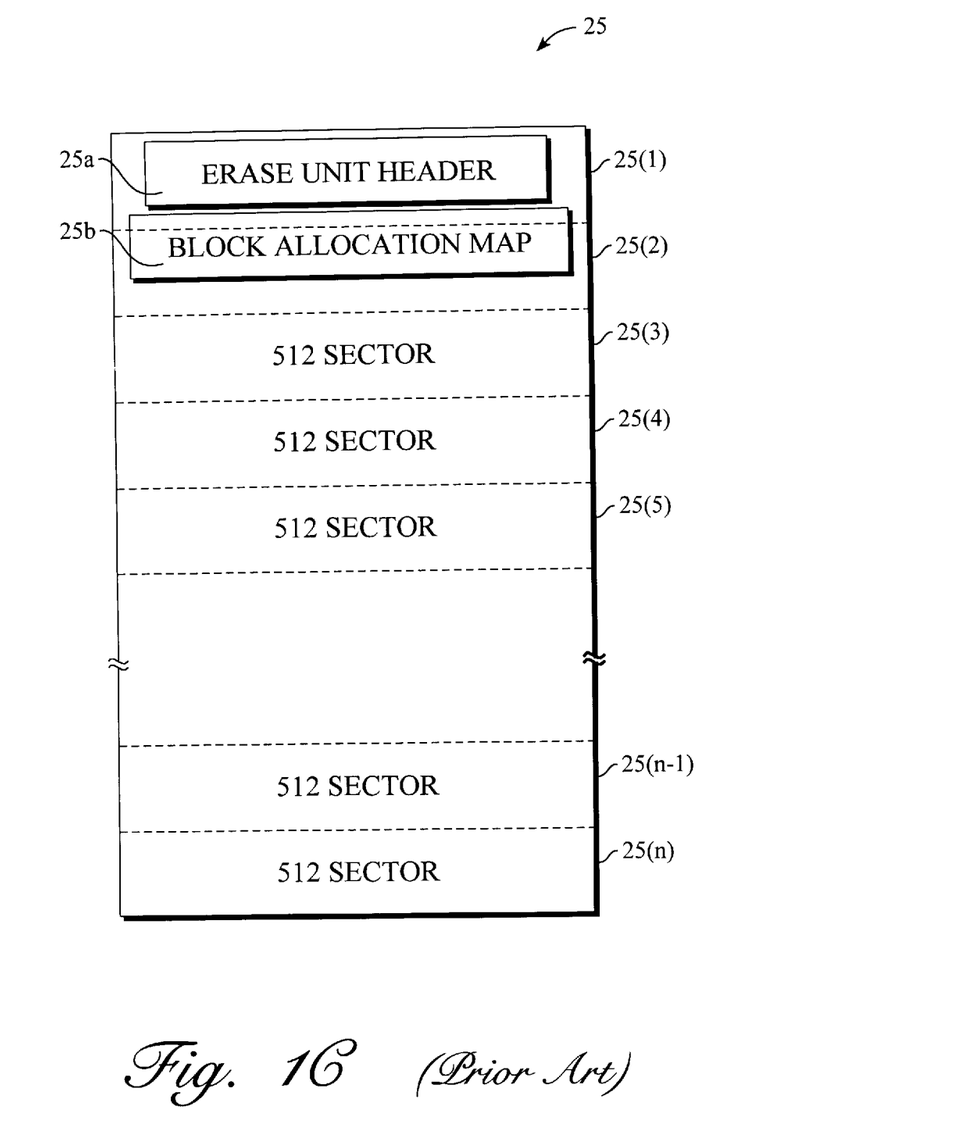
FIG. 1c is a detailed diagram of a typical erase unit according to the prior art, showing typical sector organization and the distribution the block allocation map over several sectors.

FIG. 1c is a detailed map or diagram of a typical erase unit 25 including an erase unit header 25a and a block allocation map 25b, according to the prior art. In particular, FIG. 1c shows a typical sector organization of erase unit 25. Erase unit 25 includes a plurality of sectors. 25(1)–25(n), which each may be 512 bytes in size. Erase unit 25 further includes a distribution of block allocation map 25b over several 512 byte sectors. As shown in FIG. 1c, erase unit header is located in first 512 byte sector 25(1). Block allocation map 25b is located in both first and second 512 byte sectors 25(1) and 25(2).

Figure 1D:
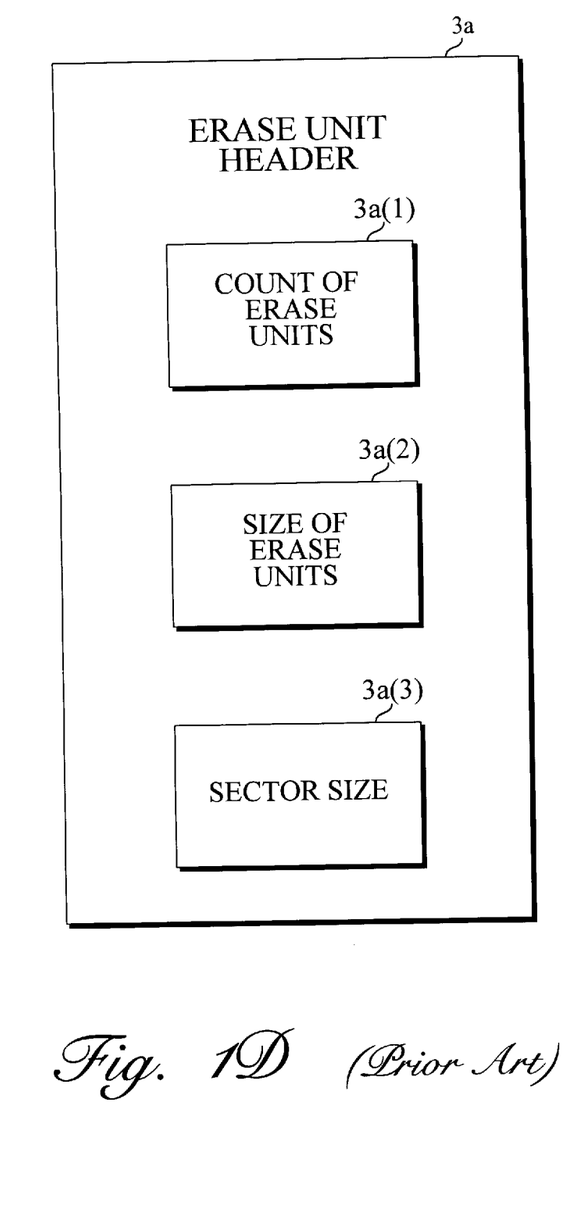
FIG. 1d is a diagram of a typical erase unit header according to the prior art, including a count of the number of erase units in a block of memory, an indication of the size of the particular erase unit, and the size of sectors in the erase unit.

FIG. 1d is a diagram of a typical erase unit header 3a according to the prior art, including a count of the number of erase units 3a(1) in a block of memory subject to memory management according to the present invention. Additionally, the diagram of FIG. 1d shows erase unit header 3a including an indication of the size of the particular erase unit 3a(2). Additionally, the diagram of FIG. 1d shows erase unit header 3a including the size of sectors in the erase unit 3a(3).

Figure 2A:
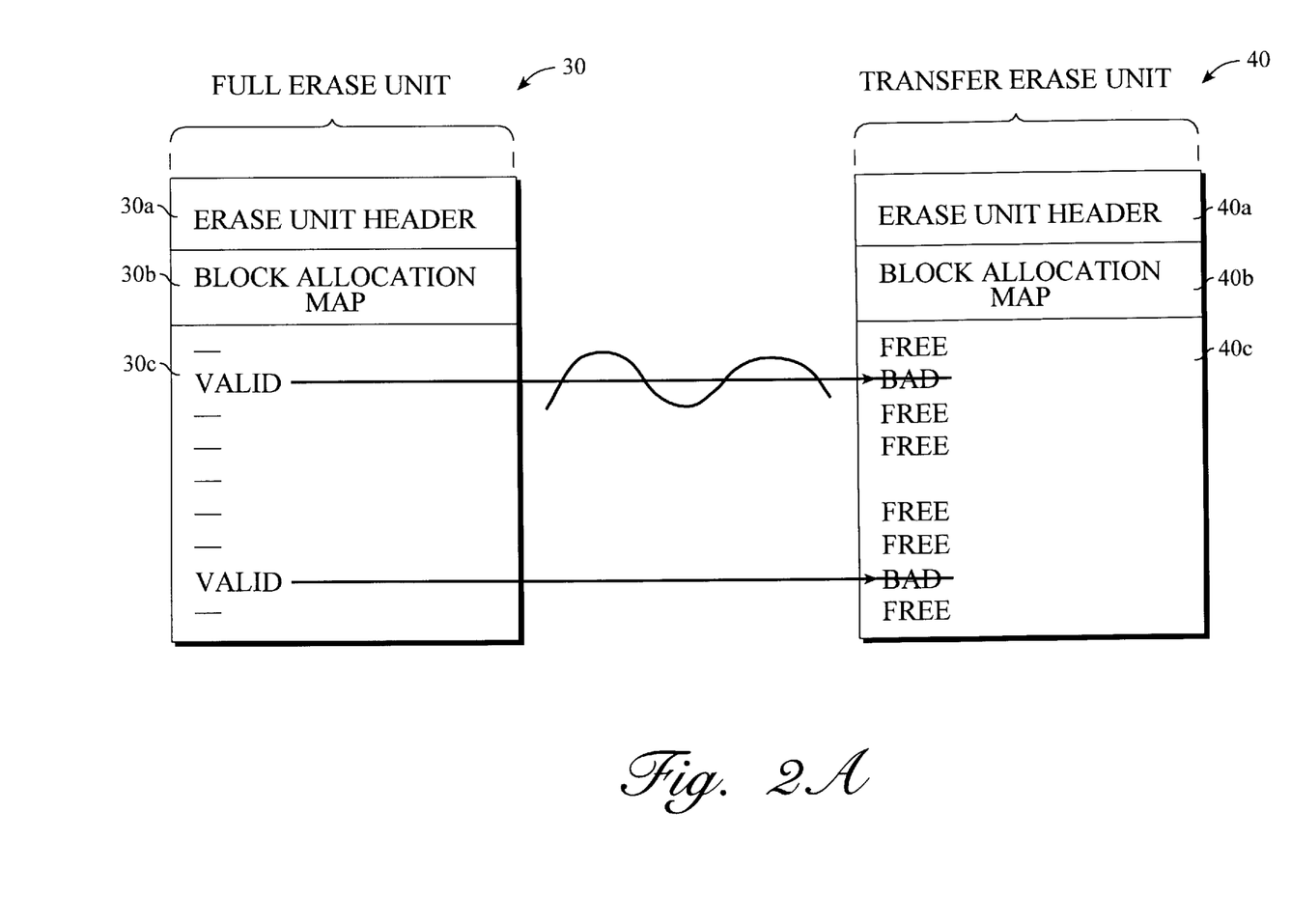
FIG. 2a is a diagram of full and transfer erase units, with valid sectors of the full erase unit to be transferred to the transfer erase unit according to the present invention.

FIG. 2a is a diagram of first and second erase units, respectively designated full and transfer erase units, 30 and 40. As shown in FIG. 2a, full erase unit 30 includes an erase unit header 30a; a block allocation map 30b (BAM); a plurality of BAM indications of the status of particular blocks in full erase unit 30 as valid, invalid, or free; and a plurality of memory locations for data storage (not shown). The valid indication "VALID" is explicitly shown in FIG. 2a; the invalid or free memory locations are generally expressed by a dash "—". Transfer unit 40 shown in FIG. 2a shows transfer erase unit 40 including an erase unit header 40a, a block allocation map 40b (BAM), a plurality of BAM indications of the status of particular blocks in transfer erase unit 40 as bad or free; and a plurality of memory locations for data storage (not shown). The second memory locations of block allocation map 40b includes a bad block which is designated by the word "BAD". The second to last memory location of block allocation map 40b is shown to be valid, because according to the present invention, a corresponding valid blocks of full erase unit 30 is moved to its corresponding free memory location in transfer unit 40. Thus, the second to last memory unit of transfer erase unit 40 which was formerly "FREE" is now redesignated as "VALID," by the movement of the associated data in full erase unit 30 to the corresponding memory location in transfer erase unit 40. However, the valid information in the full erase unit 30 corresponding to the bad location in transfer erase unit 40 cannot be moved to its corresponding location, because of its bad condition, making it not possible to move the particular information to the corresponding location in transfer erase unit 40.

Figure 2B:
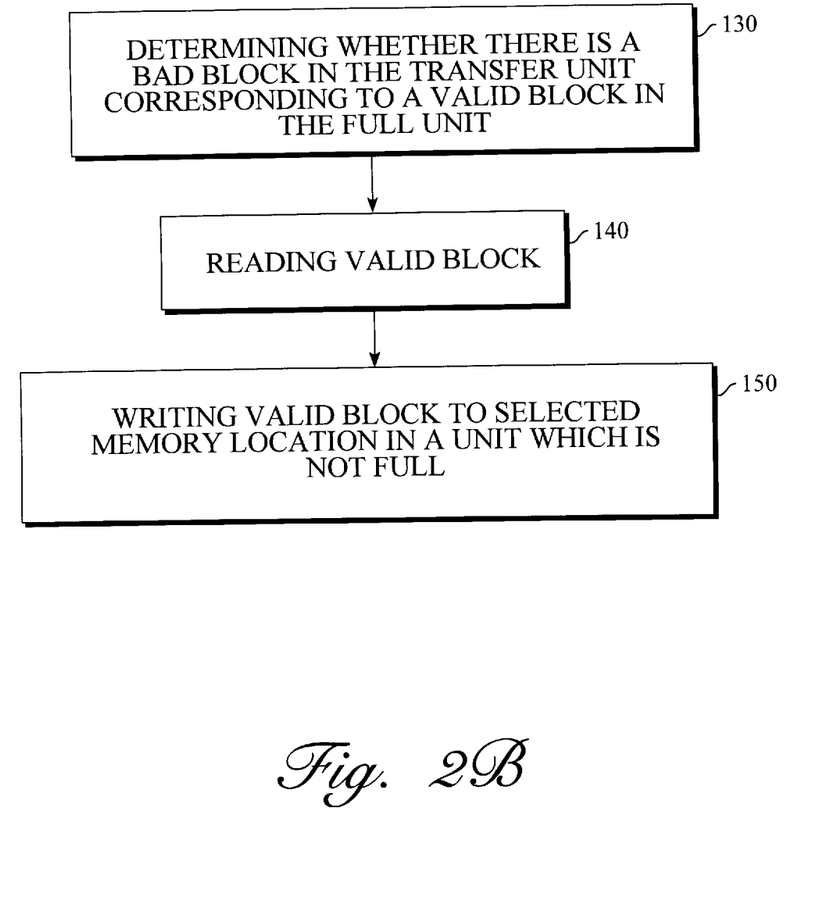
FIG. 2b is a flow chart of the block erase method according to the present invention in which a bad block in the transfer unit corresponds to a valid block in the full unit, making it impossible to move the particular valid block in the full unit to the corresponding address location in the transfer unit.

Thus, FIG. 2b is a flow chart of a block erase method according to one embodiment of the present invention in which a bad block in the transfer unit 40 corresponds to a valid block in the full unit 30, making it impossible to move the particular valid block in the full unit 30 to the corresponding address location in the transfer unit 40. In particular, according to an embodiment of the present invention, a determination is made 130 whether there is a bad block in the transfer unit 40 corresponding to a valid block in the full unit 30. If there is a bad block corresponding to a valid block in the full unit 30, the information content of the valid block is read 140. Then, the valid block which has been read is written 150 to a selected memory location in a selected erase unit which is not full at the particular selected memory location. The select erase unit can be the transfer unit 40.

Figure 3:
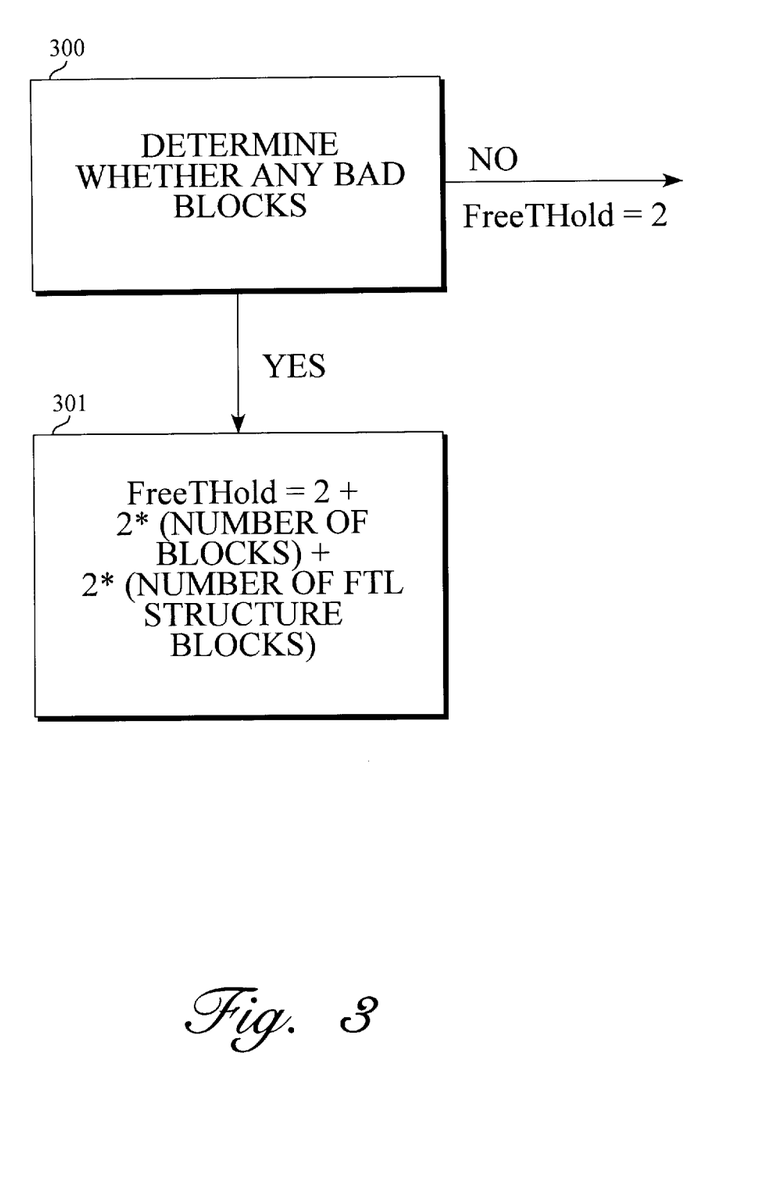
FIG. 3 is a flow chart of a method according to the present invention, to determine when cleanup is to be undertaken.

FIG. 3 is a flow chart of a method according to one embodiment of the present invention, to determine when cleanup is to be undertaken. In particular, according to the present invention, a determination is made 300 whether there are any bad blocks. If not, the threshold, FreeTHold, is set equal to a value of two (2), for example. However, if there are bad blocks, then the number of bad blocks is determined, and the threshold at which cleanup is to be undertaken equals the value of two (2) plus twice the number of bad blocks, plus twice the number of FTL structure blocks. Thus, if the number of free blocks left available in an erase unit is less than the particular threshold, then cleanup is undertaken. With no bad blocks, only two free blocks need to be available, and cleanup can be delayed until only two blocks are left. Two blocks are required as a minimum, because one block needs to be reserved for the virtual map page and one needs to be reserved for data transferred to the erase unit.

However, for any bad blocks and depending on the amount of structure blocks present within a particular transfer erase unit, cleanup must begin much earlier. For each bad block in a transfer erase unit, two additional free sectors in the transfer erase unit are required, one for a virtual map page and one to store the data from the full erase unit which would otherwise be stored at the location of the bad sector. Similarly, two sectors are needed for each flash translation layer structure block, to store its associated data and virtual map page. Thus, for each bad block in the transfer erase unit and for each flash transaction structure sector, the threshold at which cleanup is required is at least twice the number of bad blocks and flash translation layer structure blocks or sectors. Further, an additional margin of two free blocks for contingencies is used according to one embodiment of the present invention. For example, assuming one flash translation layer structure block and one bad block in the transfer unit, cleanup begins at a threshold of 6 free blocks.

What is claimed is:

1. In a flash memory having a full unit and a transfer unit, the full unit having at least one valid block of data, a method for erasing information from the full unit, comprising the steps of:

determining whether a block in the transfer unit corresponding to the valid block in the full unit is a bad block;

in response to a determination that the corresponding block in the transfer unit is a bad block:

reading the data contained in the valid block;

writing the data to another selected block in the transfer unit which is not full; and         updating a set of mapping information to indicate the new location of the data;

in response to a determination that the corresponding block in the transfer unit is not a bad block:

transferring the data contained in the valid block of the full unit to the corresponding block in the transfer unit; and     erasing the full unit when all valid blocks have been transferred out of the full unit.

2. The method of claim 1, wherein the following steps are performed prior to the determining step:

setting a threshold value for determining when to erase the full unit;

determining whether the transfer unit contains any bad blocks; and     in response to a determination that the transfer unit contains at least one bad block, adjusting the threshold value as a function of the number of bad blocks in the transfer unit.

3. The method of claim 2, wherein the adjusting step comprises the step of:

increasing the threshold value by two times the number of bad blocks in the transfer unit.

\* \* \* \* \*